July 15, 1941.                K. LÖHNER                2,249,319
     DEVICE FOR COOLING AIR-COOLED INTERNAL COMBUSTION
        ENGINES WITH THE CYLINDERS ARRANGED IN ROWS
               Filed Nov. 1, 1938         2 Sheets-Sheet 2
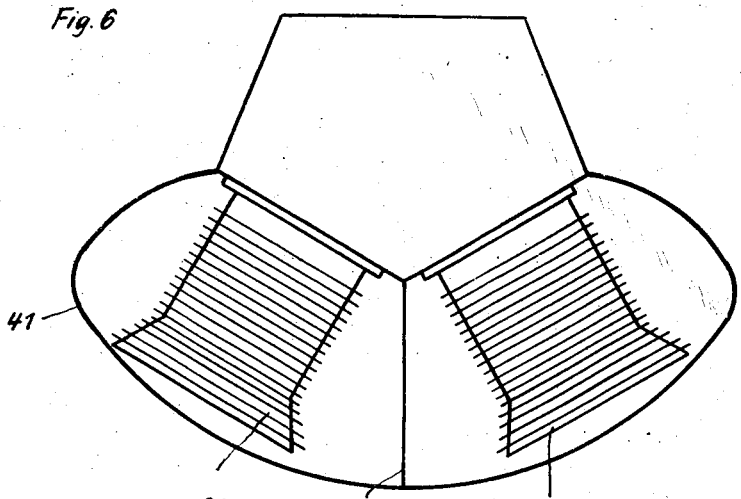
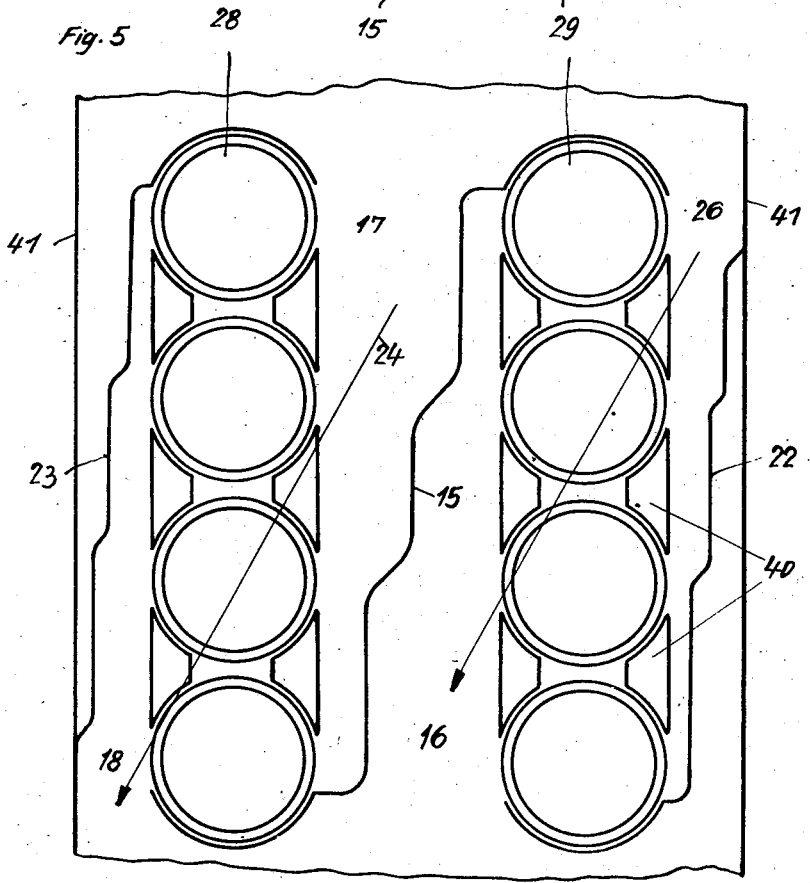
INVENTOR:
KURT LÖHNER
by A. A. Wische
ATTORNEY Patented July 15, 1941

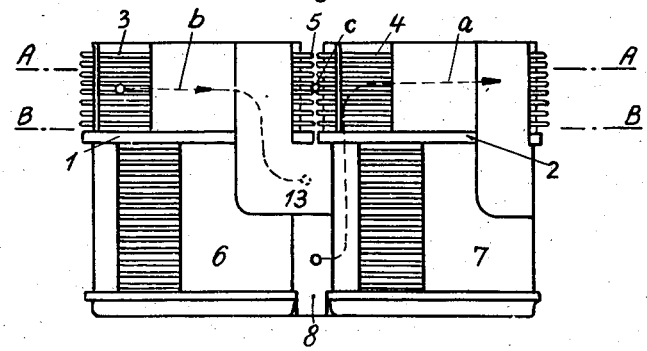
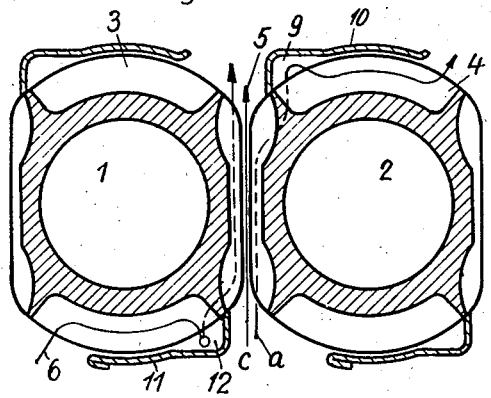
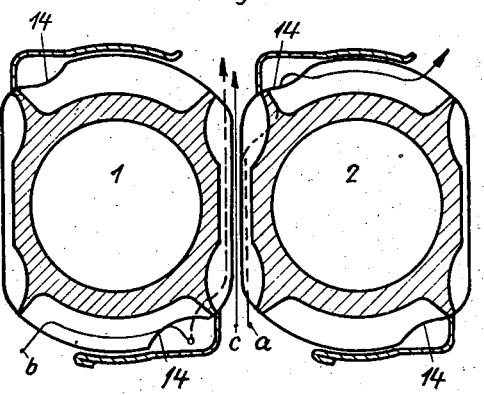
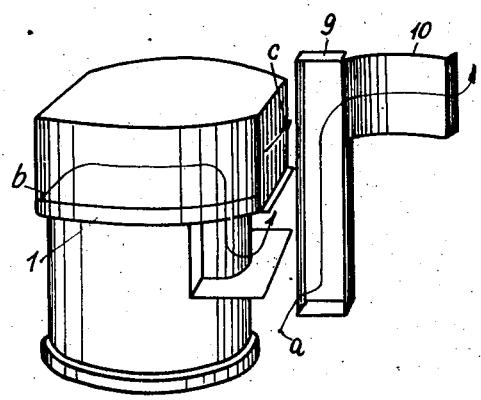
INVENTOR:
KURT LÖHNER
ATTORNEY

2,249,319

UNITED STATES PATENT OFFICE 2,249,319

DEVICE FOR COOLING AIR-COOLED INTERNAL COMBUSTION ENGINES WITH THE CYLINDERS ARRANGED IN ROWS

Kurt Löhner, Munich, Germany, assignor to the firm: Bayerische Motoren Werke Aktiengesellschaft, Munich, Germany Application November 1, 1938, Serial No. 238,137
In Germany July 28, 1937

4 Claims. (Cl. 123—171)

The subject of the present invention is an improvement in or modification of the arrangement for cooling air cooled internal combustion engines with the cylinders arranged in rows, and is a continuation-in-part of my co-pending application Serial No. 238,136, filed November 1st, 1938.

According to my above identified prior application, the spaces between adjacent cylinder rows are sub-divided into inflow and outflow spaces by guide plates so that from the partial spaces formed within each cylinder row intermediate space, one serves for guiding the cooling air flowing to the cylinders, and the other for guiding the cooling air flowing from the cylinders. The cooling air in this case passes from one partial space with the inflowing cooling air between the separate cylinders to the other side of the cylinder row into a partial space with outflowing air. A further feature resides in the fact that the cooling air stream of one cylinder row is so divided by dividing plates into a stream passing around the cylinder heads and the stream passing around the cylinder bases that each cylinder row has the cooling air passing over it from two sides in substantially inclined yet approximately parallel main directions of flow intersecting one another along each cylinder row in a plane at right angles to the cylinder row. The advantage of this cooling arrangement is the complete utilisation of the cross-sectional areas between the separate cylinder rows for the inflow and outflow of the cooling air and thus an increase of the effective quantity of cooling air.

The present invention also provides for a complete utilisation of the cross-sectional areas between the separate adjacent cylinders of the same cylinder row for the inflow and outflow of cooling air by a suitable arrangement of guide means.

In the case of air-cooled internal combustion engines with the cylinders arranged in rows, attempts have been made, in order to reduce the length and the weight as much as possible, to arrange the separate cylinders within the row as closely together as possible. In general, greater wall thicknesses and deeper cooling fins are required for the cylinder head, consisting of aluminium, to enable the withdrawal of heat to be carried out and in order to obtain sufficient strength, than for the cylinder running sleeve which consists of steel. The minimum distance between the separate cylinders is therefore determined by the diameter of the cooling fins of the cylinder heads.

For thermo-technical reasons the cooling fins provided on the steel running sleeve are lower than those provided on the aluminium cylinder head. There is thus formed a free space under the cylinder heads which are arranged close to one another, between the cylinder bases of each two adjacent cylinders.

This free cross-sectional area is utilised in accordance with the invention for cooling the cylinder heads. As a result the height of the cooling fins of the cylinder heads at the points at which two cylinders meet is made substantially lower than the height thereof at the sides of the cylinder row, and in this manner there is obtained as compact a construction of the engine as possible.

The utilisation of this free cross-sectional area is effected in accordance with the invention as follows:

The cooling air is supplied from the side to the cylinder row in any suitable manner, for example by means of guide plates, approximately at right angles to the central plane of the cylinder row.

One half of the free cross-sectional area is utilised according to the invention so as to bring fresh air backwardly in a direction looking transversely to the central plane of the cylinder row, where it is conducted upwardly through a flue and from here is guided along the rearward fins of the cylinder head thus cooling these fins.

On the side of the cylinder turned towards the supply side for the cooling air, looking in the same direction as before, that is to say on the front side of the cylinders, the cooling air is guided in the reverse direction. In this case the fresh air is firstly guided along the front fins of the cylinder head. Thereupon it is conducted through a flue downwardly and from here rearwardly through the second half of the free cross-sectional area between the cylinder bases.

In this manner the cooling air, which passes between the cooling fins between two adjacent cylinder heads at the point of connection, only has to cool these cooling fin parts whereby these may be made much lower than usual. At this point the fresh cooling air only flows for a short distance over the cooling fins. Consequently it can take up very many more heat units, and conduct them away, than a cooling air which has already been heated over a long distance.

By guiding the cooling air in accordance with the invention even cooling fins of low height are sufficiently cooled.

Further, in consequence of their low height the distance between these fins may be made extremely small by forming them for example by milling instead of by casting.

The guide means, which separate the various air streams, also provide an additional cooling surface.

In comparison with the previous state of engine technology, there is obtained, by means of the invention, a considerable improvement in that in the case of air-cooled internal combustion engines with the cylinders arranged in rows, the separate cylinders of each row can be placed very close together and thus the length of the entire engine is considerably shortened. By shortening the length the weight of the engine and thus the very important specific weight of the engine, particularly in connection with air craft engines, is reduced.

These and other features of the invention will be best understood and appreciated from the following description of a preferred embodiment thereof, described for purposes of illustration and shown in the accompanying drawings, in which:

Fig. 1 is a side elevation of two cylinders in a row, embodying the cooling passages and channels formed in accordance with this invention;

Fig. 2 is a cross-sectional view along the line A—A of Fig. 1;

Fig. 3 is a perspective view of one cylinder and part of the air guiding means of the next succeeding cylinder in a row, showing the path of the directed cooling air;

Fig. 4 is a cross-sectional view along the line B—B of Fig. 1;

Fig. 5 is a longitudinal cross-section illustrating the manner in which the oncoming cooling air is laterally directed against the rows of cylinders as originally disclosed in my above identified copending application Serial No. 238,136; and Fig. 6 is a transverse cross-sectional view taken through Fig. 5.

The present invention is concerned with construction involving the cooling of a plurality of cylinders aligned in one or more rows, including V-engines, radial engines, etc., and in which the cooling air is directed laterally along the rows of cylinders by means such as illustrated by way of example in Figs. 5 and 6 and described in more detail hereinafter. Figs. 1 to 4 inclusive pertain particularly to two adjacent cylinders of a row to be cooled, said cylinders being provided with enlarged head portions having cooling fins 3 and 4 of normal size along their outer edges, and narrower cooling fins 5 in between them, whereby the cylinders may be positioned much closer to one another than in the usual case. This advantageous construction, is brought about in a manner to be explained hereinafter, without any resultant loss in effective cooling of the cylinder head.

Since the cylinder bases 6 and 7 are of smaller diameter than the cylinder heads, there remains between them an open space 8. By suitable attached means forming a flue 9 and guiding plate 10, the stream of air a directed laterally against the lower portion of the open space 8 is guided upwardly on the far side of the second cylinder 2 and then forwardly through the cooling fins 4 on the far side of this cylinder head. By this means, and by similar means positioned on all of the cylinders of the row, effective cooling of this side of the cylinder heads is in all cases assured.

By means of a second guiding plate 7 and a downwardly guiding flue 12 another part of the laterally directed cooling air stream b is used for cooling the near side of the cylinder head. The air after being heated by contact with the cooling fin which is on the near side of the cylinder head, is guided downwardly by the flue 12 and then the heated air passes through the upper portion 13 of the space between the cylinder bases. It will be thus seen that the space between the cylinder bases which otherwise would not be fully used is effectively entirely utilized for cooling the far and near sides of the cylinder head. This leaves the third part of the laterally directed air stream c for solely cooling the cylinder head along the part intermediate adjacent cylinders. Since this cooling stream c is used for no other purpose and is not heated to a material extent before contact with the cooling fin 5 a very effective and efficient cooling is obtained at this point. Because of the effectiveness of the above described cooling arrangement, the fins 5 may be made smaller, thus permitting a closer mounting of the cylinders, thereby in turn reducing the effective length of the engine.

In order to maintain a full constant cross-sectional area within the flues 9 and 12, the cooling fins 3 and 4 of the cylinder heads may be bent or cut away at an angle at these points, as is best shown in Fig. 4, where the reference numeral 14 shows the cut-away portion.

The cylinder bases are enclosed in regular jacket guide plates, which, however, in no manner interfere with the aforedescribed arrangement for cooling the cylinder heads. The cooling fins 5 between adjacent cylinders may be formed in any well known manner, and, due to their small side, may merely be grooves which have been milled or otherwise cut into these parts of the cylinder heads.

The manner of attaching the various guiding means 9, 10, 11 and 12 is of no particular importance with respect to this invention. They may be either produced in the usual manner from sheet metal, or may be applied as cast, machined or un-machined parts of the cylinder.

As the means for directing the air laterally against the sides of the cylinder rows, the construction illustrated in Figs. 5 and 6 may be used. This construction was originally disclosed and described in my aforesaid co-pending application. As is there illustrated, the space between the cylinder rows 28 and 29 is divided by a guide plate 15 into two partial spaces 16 and 17, the one space 17 serving for directing the air laterally against the cylinder row 28, while the space 16 is used for conducting the air away from the cylinder row 29. The invention has been illustrated as applied to a V-engine of two cylinder rows, which are covered by a general casing member 41. Additional guide plates positioned between the cylinder rows and the casing are illustrated at 22 and 23. The guide plate 22 directs the air 26 laterally against the cylinder row 29, while the guide plate 23 forms a partial space 18 to conduct the heated air 24 away from the cylinder row 28. If the principles of the present invention are applied to the construction illustrated in Figs. 5 and 6, the means illustrated at 40 for guiding the air about the cylinders will be replaced by the guiding means of the present invention. In the case of a radial engine, the outer casing member 41 will not be present, and the guiding means between the heated row of cylinders will be formed similarly to the guiding plate 15. It is pointed out, however, that the principles of the present invention are not intended to be limited for use in connection with the arrangements illustrated in Figs. 5 and 6, but will be applicable to any arrangement wherein means are provided for laterally directing cooling air against the rows of multiple cylinders.

Having now thus described the invention, and the specific embodiment thereof, as well as the function and mode of operation of the same, what I claim as new and desire to secure by Letters Patent of the United States is:

1. In an internal combustion engine of the class provided with rows of more than one cylinder each, said cylinders being each provided with a finned base portion, an enlarged finned head portion, and means for directing cooling air laterally against a row of cylinders, the combination of a first guide means on each cylinder head for guiding said directed air along one side of said head, and then downwardly and transversely through a portion of the space between the cylinder bases, and second guide means for conducting the cooling air flowing through the remaining portion of the space between the cylinder bases upwardly and forwardly along the opposite side of the head of the next cylinder, whereby the air directed laterally between adjacent cylinder heads is utilized entirely for cooling these cylinder head sides.

2. The combination according to claim 1, in which the cooling fins on the cylinder heads between adjacent cylinders of the same row are shorter than those on the sides of the cylinders.

3. In an internal combustion engine of the class provided with rows of more than one cylinder each, said cylinders being each provided with a finned base portion, an enlarged finned head portion, and means for directing cooling air laterally against a row of cylinders, the combination of a first guide plate and connecting flue for receiving the laterally directed air, guiding it forwardly along the near side of one cylinder head and then downwardly and transversely through a portion of the space between the cylinder bases, and a second flue and guiding plate for receiving the laterally directed cooling air through the remaining space between the cylinder bases, and thence guiding it upwardly and forwardly along the far side of the next cylinder head, whereby the laterally directed air between adjacent cylinder heads is used entirely for cooling said head along the transverse sides thereof.

4. The combination according to claim 3, in which the fins on the cylinders within the flues are inclined in such a manner as to maintain a constant cross-sectional area throughout said flues.

KURT LÖHNER.